Patented Dec. 13, 1949

2,490,834

UNITED STATES PATENT OFFICE 2,490,834

BENZHYDRYL BETA HYDROXY ALKYL AMINES

George Rieveschl, Jr., and Robert W. Fleming, Grosse Pointe Woods, Mich., assignors to Parke, Davis & Company, Detroit, Mich., a corporation of Michigan No Drawing. Application July 15, 1946, Serial No. 683,774

6 Claims. (Cl. 260—570)

This invention relates to a new class of tertiary amines and to methods for obtaining the same. More specifically, the invention relates to substituted benzhydryl β-hydroxy alkyl amines and their acid addition salts. The free bases of the compounds of the present invention have the formula,

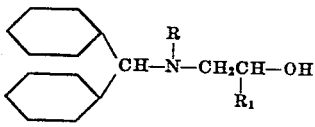

where R is a lower alkyl or lower alkenyl radical and $R_1$ is hydrogen or methyl.

In accordance with the invention the new tertiary amines may be obtained as a free base having the formula given above or as an acid addition salt of the base with an inorganic or organic acid. Some examples of the salts which may be prepared by the methods hereinafter described are the hydrochloride, hydrobromide, hydroiodide, sulfate, sulfamate, phosphate, acetate, citrate, oxalate, succinate, benzoate, tartrate, phthalate, maleate, oleate and the like.

It has been found that the compounds of the present invention may be obtained by several different methods. For example, they may be prepared by the reaction of a benzhydryl halide and an alkyl or alkenyl β-hydroxyalkyl amine. The reaction is preferably carried out in an inert organic solvent such as benzene, toluene or xylene. A modification of this process involves the use of an alkaline material to react with the mineral acid formed during the reaction. When the reaction is carried out in the presence of such materials a smaller quantity of amine is required since the amine is not removed from the reaction by salt formation. In general, when no acid binding agent is employed it is preferable to use about two or more equivalents of amine for each equivalent of benzhydryl halide. Some of the alkaline substances which may be used in the process are alkali metal hydroxides, oxides, alcoholates, carbonates, bicarbonates, acetates and the like. The alkaline earth metal hydroxides, oxides and carbonates may also be used.

Alternatively, a benzhydryl alkyl or alkenyl amine can be reacted with a β-hydroxy alkyl halide under substantially the same conditions as described above for the reaction of a benzhydryl halide with an alkyl or alkenyl β-hydroxy alkyl amine. Still another method for obtaining these new tertiary amino alcohols consists in reacting ethylene oxide or 1, 2-propylene oxide with a benzhydryl alkyl or alkenyl amine in an inert organic solvent such as methanol, ethanol, benzene, toluene, xylene, dioxane and the like.

The substituted benzhydryl β-hydroxy alkyl amines and their acid addition salts are useful in the preparation of other organic compounds and find particular use in the preparation of sympatholytic agents.

The invention is illustrated by the following examples.

*Example 1.—Benzhydryl methyl β-hydroxyethyl amine*

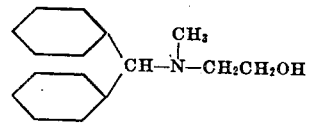

A mixture consisting of 75.1 g. of methyl ethanol amine, 138 g. of anhydrous potassium carbonate and 150 cc. of benzene is refluxed and stirred while 247 g. of benzhydryl bromide in 150 cc. of benzene is added to the solution over a period of one hour. After the addition has been completed the mixture is refluxed for three hours, cooled and treated with 500 cc. of water. The organic layer is separated, washed twice with water and then extracted with 1 liter of 10% hydrochloric acid. The free base is liberated from the acidic aqueous extracts by the addition of 10% sodium hydroxide solution, extracted with ether and the ether extracts dried over anhydrous potassium carbonate. The drying agent is removed by filtration, the ether evaporated from the filtrate and the residue distilled under reduced pressure. The fraction boiling at 151.5–165° C./1 mm, which consists of benzhydryl methyl β-hydroxyethyl amine is collected.

*Example 2.—Benzhydryl ethyl β-hydroxyethyl amine*

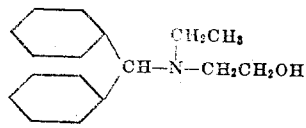

(a) A solution of 494 g. of benzhydryl bromide in 200 cc. of benzene is added slowly to a stirred and refluxing mixture consisting of 200 g. of ethyl ethanol amine and 276 g. of anhydrous potassium carbonate in 200 cc. of benzene. After the addition has been completed, ca. one hour, the mixture is refluxed for one and a half hours. Carbon dioxide is evolved during the reaction. The reaction mixture is cooled, treated with 500 cc. of water and the organic layer separated. The organic layer is extracted with an excess of dilute hydrochloric acid and the acidic extracts made alkaline with 10% sodium hydroxide solution. The free base of the desired product is extracted with ether, the ether extracts dried and the ether distilled. The residue is distilled under reduced pressure to obtain the purified free base of benzhydryl ethyl β-hydroxethyl amine as a colorless viscous oil; B. P. 156–68° C./1 mm.

The hydrochloride salt of benzhydryl ethyl β-hydroxyethyl amine is prepared by dissolving a small amount of the product in dry ether and adding an excess of dry hydrogen chloride gas or isopropanolic hydrogen chloride. It separates from the solution as a white fluffy solid which may be collected and purified by recrystallization from isopropanol-ether mixture. (b) A solution consisting of 123 g. of benzhydryl bromide and 89.2 g. of ethyl ethanol amine in 300 cc. of benzene is refluxed for six hours. The reaction mixture is cooled and the crystalline hydrobromide salt of ethyl ethanol amine which has separated during the reaction removed by filtration. The filtrate is extracted with several portions of dilute hydrochloric acid, the acidic extracts made alkaline by the addition of 10% sodium hydroxide solution and the free base extracted with ether. After drying and removal of the ether the residue is distilled under reduced pressure to obtain the free base of benzhydryl ethyl β-hydroxyethyl amine; B. P. ca. 160° C./1 mm.

The hydrochloride salt was prepared from this product and found to melt at the same temperature as that prepared from the product produced by the method (a) described above. Mixing the hydrochloride salts produced by methods (a) and (b) did not depress the melting point.

*Example 3. Benzhydryl n-propyl β-hydroxyethyl amine*

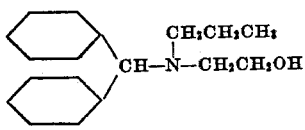

Ethylene oxide is bubbled into a warm solution of 225 g. of benzhydryl n-propylamine in 500 cc. of benzene and 100 cc. anhydrous methanol until the gain in weight of the reaction mixture is approximately 44 g. The solvent is distilled off and the residue distilled under reduced pressure to obtain the desired benzhydryl n-propyl β-hydroxyethyl amine.

The free base may be converted to an acid addition salt such as the hydrobromide by dissolving it in dry ether and adding an excess of an absolute alcohol solution of dry hydrogen bromide. The hydrobromide salt which separates from the solution is collected and purified by recrystallization from isopropanol-ethyl acetate mixture.

*Example 4. Benzhydryl iso-propyl β-hydroxyethyl amine*

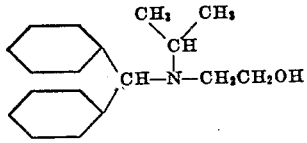

112 g. of benzhydryl iso-propylamine is dissolved in 300 cc. of toluene and ethylene oxide bubbled into the warm solution until the weight gain of the reaction mixture is approximately 25 g. The toluene is distilled off using a water pump and the residue distilled in high vacuo to obtain the free base of benzhydryl iso-propyl β-hydroxyethyl amine as a colorless, viscous oil.

*Example 5. Benzhydryl allyl β-hydroxyethyl amine*

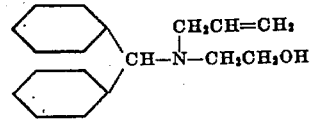

A solution of 101 g. of benzhydryl chloride in 200 cc. of benzene is added to a refluxing mixture composed of 55 g. of allyl ethanol amine and 55 g. of anhydrous sodium carbonate in 300 cc. of benzene over a period of three-quarters of an hour. After the addition has been completed the mixture is refluxed for six hours, cooled and treated with 500 cc. of water. The organic layer is separated, extracted with several portions of dilute hydrochloric acid and the acidic extracts made alkaline in the cold with 20% potassium hydroxide solution. The free base of the product is extracted with ether, the ether extracts dried and the ether distilled. The residue is distilled under reduced pressure to obtain the pure free base of benzhydryl allyl β-hydroxyethyl amine.

The hydrochloride salt of the free base may be prepared by dissolving the product in ether and treating the resulting solution with an excess of dry gaseous hydrogen chloride. The white fluffy hydrochloride salt is collected and purified by recrystallization from n-propanol-ether mixture.

*Example 6. Benzhydryl n-butyl β-hydroxyethyl amine*

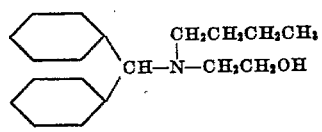

494 g. of benzhydryl bromide in 200 cc. of benzene is added dropwise over a period of two hours to a refluxing solution of 469 g. of n-butyl ethanol amine in 200 cc. of benzene and the resulting mixture refluxed for three hours. The reaction mixture is cooled and the n-butyl ethanol amine hydrobromide removed by filtration and washed with several portions of ether. The filtrates are combined and distilled under reduced pressure to obtain the free base of benzhydryl n-butyl β-hydroxyethyl amine; B. P. 153–6° C./1 mm.

*Example 7. Benzhydryl n-hexyl β-hydroxyethyl amine*

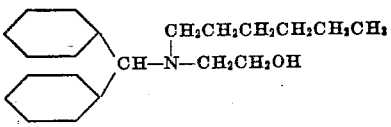

A solution of 237 g. of benzhydryl bromide in 100 cc. of toluene is added slowly to a refluxing solution of 300 g. of n-hexyl ethanol amine in 100 cc. of toluene and the solution refluxed for a total of six hours. The mixture is cooled and the n-hexyl ethanol amine hydrobromide removed by filtration. The filtrate is placed in a distilling flask and distilled under reduced pressure to obtain the pure free base of benzhydryl n-hexyl β-hydroxyethyl amine as a colorless, viscous oil.

Example 8.—Benzhydryl methyl β-hydroxypropyl amine

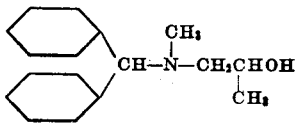

80 g. of 1,2-propylene oxide is added to a solution of 187 g. of benzhydryl methyl amine in 200 cc. of methanol and the solution refluxed overnight. The methanol is distilled off and the residue distilled under reduced pressure to obtain the desired benzhydryl methyl β-hydroxypropyl amine as a colorless, viscous oil.

The oxalate salt of benzhydryl methyl β-hydroxyethyl amine can be obtained by adding the free base to a warm saturated solution of oxalic acid dihydrate in isopropanol or nitromethane. Ethyl acetate is added, the mixture cooled and the white crystalline product which separates collected.

Example 9.—Benzhydryl ethyl β-hydroxypropyl amine

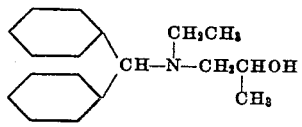

47.3 g. of 1-chloro-2-hydroxypropane in 50 cc. of benzene is added slowly to a refluxing solution of 201 g. of benzhydryl ethyl amine in 200 cc. of benzene and the resulting mixture refluxed for six hours. The mixture is cooled, the benzhydryl ethyl amine hydrochloride filtered off and the benzene distilled from the filtrate. The residue is distilled under reduced pressure to obtain the pure benzhydryl ethyl β-hydroxy propyl amine.

The citrate salt can be obtained by adding an ether solution of the free base to an ether solution of citric acid. The salt separates as a fine white powder which may be purified by washing with ether.

Example 10.—Benzhydryl allyl β-hydroxypropy amine

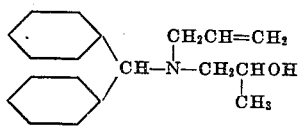

15 cc. of 1,2-propylene oxide is added to a solution of 22.3 g. of benzhydryl allyl amine in 50 cc. of absolute alcohol and the solution refluxed for twenty hours. The solvent is removed by distillation and the residue distilled under reduced pressure to obtain the free base of benzhydryl allyl β-hydroxypropyl amine as a colorless, viscous oil.

A solution of 0.75 g. of oxalic acid in 5 cc. of hot nitromethane is added to a solution of 1.5 g. of the product in 5 cc. of nitromethane. On cooling the acid oxalate acid addition salt separates as coarse crystals; M. P. 184–5° C.

Example 11.—Benzhydryl n-propyl β-hydroxypropyl amine

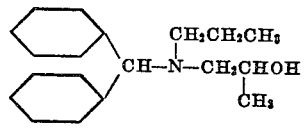

237 g. of benzhydryl bromide in 200 cc. of benzene is added dropwise to a refluxing mixture consisting of 120 g. of n-propyl β-hydroxypropyl amine and 75 g. of anhydrous potassium carbonate in 150 cc. of benzene and the resulting mixture refluxed for six hours. The mixture is cooled, treated with 500 cc. of water and the organic layer separated. The organic layer is extracted with dilute hydrochloric acid and the aqueous extracts made alkaline by the addition of 10% sodium hydroxide solution. The free base of benzhydryl n-propyl β-hydroxypropyl amine which separates from the alkaline solution is extracted with ether and purified by distillation in vacuo.

The secondary benzhydryl amines used as starting materials are prepared by heating a benzhydryl halide such as benzhydryl bromide with an excess of an appropriate primary amine. Thus, for example, the benzhydryl n-propyl amine which is used in Example 3 is prepared by refluxing a solution of benzhydryl bromide and an excess of n-propyl amine in absolute ethanol for about two hours. The alcohol is distilled off and the residue treated with water. Ether is added, the ether layer separated and extracted with several portions of dilute hydrochloric acid. The acidic aqueous extracts are made alkaline in the cold with 10% sodium hydroxide solution and the free base extracted with ether. The ether extracts are dried, the ether evaporated and the residue distilled under reduced pressure to obtain the desired benzhydryl n-propyl amine; B. P. 117–20° C./1 mm.

What we claim is:

1. A compound of the class consisting of a free base and its acid addition salts, said free base having the formula,

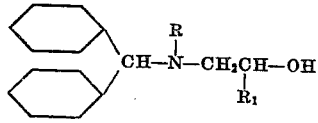

where R is a member of the class consisting of lower alkyl and lower alkenyl radicals and $R_1$ is a member of the class consisting of hydrogen and methyl.

2. A compound of the class consisting of a free base and its acid addition salts, said free base having the formula,

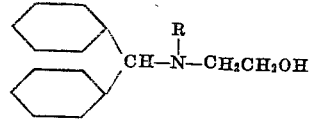

where R is a lower alkyl radical.

3. A compound of the formula,

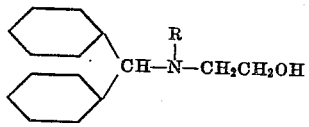

where R is a lower alkyl radical.

4. A compound of the formula,

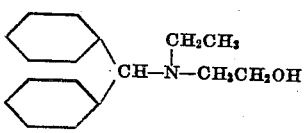

5. A compound of the formula,

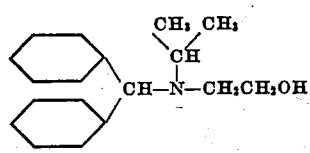

6. A compound of the formula,

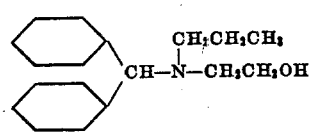

GEORGE RIEVESCHL, JR.
ROBERT W. FLEMING.

REFERENCES CITED

The following references are of record in the file of this patent:

UNITED STATES PATENTS

| Number | Name | Date |
|---|---|---|
| 2,229,187 | Peyer | Jan. 21, 1941 |

FOREIGN PATENTS

| Number | Country | Date |
|---|---|---|
| 127,515 | Hungary | Aug. 1, 1941 |

OTHER REFERENCES

Busch et al. "J. prak. chem." vol. 77, pp. 20–24 (1908).

DeL, "Rec. trav. chim.," vol. 30, pp. 260–269 (1911).

Maxim et al., "Bull. soc. chim. Mem.," vol. 3, pp. 1084–1093 (1936).